(12) United States Patent
Andersen

(10) Patent No.: US 6,447,827 B1
(45) Date of Patent: Sep. 10, 2002

(54) METHOD OF PROCESSING FOOD PRODUCTS

(75) Inventor: Jørgen Andersen, Svendborg (DK)

(73) Assignee: Cabinplant International A/S, Harby (DK)

(*) Notice: Subject to any disclaimer, the term of this patent is extended or adjusted under 35 U.S.C. 154(b) by 0 days.

(21) Appl. No.: 09/828,443

(22) Filed: Apr. 6, 2001

(30) Foreign Application Priority Data

Apr. 13, 2000 (EP) .............................................. 00610040

(51) Int. Cl.$^7$ ................................................. A23L 1/00
(52) U.S. Cl. ......................... 426/231; 99/325; 99/468; 99/470; 426/510; 426/511; 426/524
(58) Field of Search ................................ 426/231, 510, 426/511, 523, 524; 99/325, 468, 470, 474

(56) References Cited

U.S. PATENT DOCUMENTS

| | | | |
|---|---|---|---|
| 3,840,686 A | * 10/1974 | Hurwitz | 426/231 |
| 4,058,635 A | 11/1977 | Durth | 426/510 |
| 4,066,011 A | 1/1978 | Ballentine | 426/524 |
| 4,714,618 A | 12/1987 | Matsuda | 99/467 |
| 5,505,975 A | * 4/1996 | Taylor | 426/510 |

FOREIGN PATENT DOCUMENTS

| | | |
|---|---|---|
| JP | 58205483 | 11/1983 |
| JP | 60188048 | 9/1985 |
| WO | WO9821974 | 5/1998 |

* cited by examiner

Primary Examiner—George C. Yeung
(74) Attorney, Agent, or Firm—Howard J. Klein

(57) ABSTRACT

The present invention relates to a method of processing fish in a food processing unit (72), which method comprises the following steps: thawing (44, 62) during a thawing period by ejecting steam and water within the food processing unit (72) while continuously re-circulating air, cooking (46, 64) during a cooking period by firstly discontinuing ejecting water while continuing ejecting steam into the food processing unit, and secondly re-circulating air to maintain the ambient temperature at a predetermined temperature, cooling (48, 66) during a cooling period by discontinuing ejecting steam while ejecting water and continuously re-circulating exterior air communicated to the food processing unit (72). The food processing unit (72) is calibrated for determining the duration of the thawing, cooking, and cooling periods by using a temperature sensitive device to measure a core temperature of the fish and to establish the duration of the three periods according to the core temperature.

11 Claims, 7 Drawing Sheets

METHOD OF PROCESSING FOOD PRODUCTS

The present invention generally relates to the technical field of processing a food product in particular fish in a food processing unit defining an interior space having an ambient temperature and a relative humidity controllable by the food processing unit.

The state of the art food processing of a food product generally comprises a thawing step in which the food products in particular fish are submerged into pool of salt water being recirculated so as to provide a good temperature transfer between the fish and the salt water. This operation is continued until the fish temperature reaches approximately 0° C. Next, the fish are removed from the salt water pool during a staging step and exposed to the ambient temperature initially in the range from 10° C. to 18° C. and slowly increasing to approximately 60° C. Next, the fish are pre-cooked during a pre-cooking step in which the fish are exposed to an ambient temperature of approximately 100° C. until the fish temperature reaches approximately 65° C. Next the fish are spray cooled during a spray cooling step in which the ambient temperature is reduced from approximately 100° C. to approximately 20° C. by spraying the fish with cooling water until the fish reaches a temperature of approximately 50° C. Finally, the fish are chilled during a chill conditioning step during which the ambient temperature remains in the temperature range 20° C. to 30° C. until the fish reaches the ambient temperature.

In the state of the art food processing techniques the entire process lasts for approximately eighteen to nineteen hours from frozen food product to treatable cooked food product. Thus the time needed for processing the food products is very long and expensive, since the product flow is determined entirely on the basis of the process. Further the food product quality during the processing is generally not continuously monitored, potentially causing non-suitable food products to complete the entire process and unnecessarily contributing to the energy consumption.

Hence the state of the art food processing techniques are accomplished without specific considerations regarding processing efficiency and quality for any particular food products. These considerations include energy consumption of the processes, food processing quality defining timing and duration of operations and food processing repeatability.

An object of the present invention is to provide an environment for thawing, cooking and cooling of a food product or food products in particular fish, which environment avoids any oxidation of the surface of the food products during the thawing, cooking and cooling.

A further object is to establish environment enabling an improved energy transfer between the food products and the environment while limiting dehydration of the food products.

An additional object is to provide a reduction of the food processing time employed in state of the art food processing methods and apparatus thus achieving a reduction of the processing time and saving working hours associated with the processing.

A particular advantage of the present invention is utilisation of heat energy by conservation or reuse of established temperatures and relative humidities during the thawing, cooking and cooling of food products.

A particular feature of the present invention is that thawing, cooking and cooling may all be implemented in one processing chamber by continuously changing the internal environment of the processing chamber or in a series of processing chambers interconnected via ports and transporting the food products from one processing chamber performing one operation to a next processing chamber performing a second operation.

Above mentioned object, advantage and feature together with numerous other objects, advantages and features which will become evident from below detailed description of a preferred embodiment of the present invention is according to a first aspect of the present invention obtained by a method of processing a food product in particular fish in a food processing unit defining an interior space having an ambient temperature and a relative humidity controllable by said food processing unit and comprising following steps:

(a) thawing of said food product during a thawing period by inserting said food product in said interior space of said food processing unit and ejecting steam and water into said interior space while continuously re-circulating air within said interior space so as to increase said ambient temperature to a first temperature and said relative humidity to a pre-set relative humidity value, (b) cooking of said food product in said interior space of said food processing unit during a cooking period by firstly discontinuing ejecting water into said interior space while continuing ejecting steam into said interior space so as to increase said ambient temperature from said first temperature to a second temperature, and secondly as said ambient temperature reaches said second temperature recirculating air within said interior space to maintain said ambient temperature at said second temperature, (c) cooling of said food product in said interior space of said food processing unit during a cooling period by discontinuing ejecting steam into said interior space while ejecting water into said interior space and continuously re-circulating exterior air within said interior space communicated from outside of said interior space so as to decrease said ambient temperature to a third temperature, and (d) calibrating said food processing unit by determining duration of said thawing period, duration of said cooking period and duration of said cooling period by utilising temperature sensitive means measuring a core temperature of said food product and establishing said duration of said thawing period, duration of said cooking period and said duration of cooling period according to said core temperature of said food product so as to terminate said thawing when said core temperature reaches a predetermined first core temperature, terminate said cooking when said core temperature reaches a predetermined second core temperature and terminate said cooling when said core temperature reaches a predetermined third core temperature, so as to establish an interior environment in said interior space enabling energy transfer between said food product and said interior environment while limiting dehydration of said food product.

According to the realisation of the first aspect of the present invention the method provides thawing, cooking and cooling of a food product while continuously monitoring the conditions of the interior space of the food processing unit. Thus providing a very accurately controlled environment in the interior space optimised for the food product to be processed. Further the method according to the first aspect of the present invention ensures that energy consumption caused by heating the interior space is kept to a minimum by utilising the conditions of a previous process environment to establish a following process environment in the interior space. Thus thawing, cooking and cooling is performed as a continuous sequence so as to achieve low energy consumption of said food processing unit.

The food product may according to the first aspect of the present invention comprise a plurality of diary products, vegetable products, fruit products. poultry products, meat products, fish products or any combinations thereof. Any product may be processed utilising the food processing unit to provide the best possible processing of that particular food product. The first aspect of the present invention may be configured to provide processing in accordance to any particular food product and will enable a user to easily conform to any desired processing.

In accordance with above described feature the first aspect of the present invention provides for the interior space of the food processing unit to define a single compartment for receiving the food product and for sequentially performing the thawing, the cooking and the cooling of the food product, or to define a plurality of compartments for sequentially receiving the food product and for performing the thawing, the cooking and the cooling of the food product in separate compartments. By implementing the first aspect of the present invention having a single compartment or a plurality of compartments all the processes may be performed in a single compartment allowing for a highly accurate food processing. And by implementing the first aspect of the present invention having a plurality of compartments each performing a separate process on the food product a very efficient process may be achieved.

The first aspect of the present invention may have a preset relative humidity value defined n a relative humidity range between 80% and 100% such as between 90% and 100% or 95% and 100%. Preferably the relative humidity during the thawing is 100%. The first temperature is defined in a temperature range between 30° C. and 50° C. such as between 35° C. and 40° C, 40° C. and 45° C. or 45° and 50° C. Preferably the first temperature is approximately 38° C. The second temperature is defined in a temperature range between 90° C. and 100° C. such as between 92° C. and 98° C. or 94° C. and 96° C. Preferably the second temperature is approximately 95° C. Further the third temperature is defined in a temperature range between 15° C. and 35° C. such as between 20° C. and 30° C. or 24° C. and 26° C. Preferably the third temperature is approximately 25° C. or equal to the exterior air temperature. All temperatures measured at normal atmospheric pressure. By selecting the first, second and third temperatures within the above mentioned temperature ranges in conjunction with accurately controlling the relative humidity of the interior of the food processing unit a significantly improved thawing is achieved avoiding unnecessary oxidation of the surfaces of the food products.

The first aspect of the present invention may further provide for having the predetermined first core temperature terminating the thawing period in a temperature range between −5° C. and +5° C. such as ranges −2° C. to +2° C. or −1° C. to +1° C. Preferably the predetermined first core temperature terminates the thawing period when the temperature is approximately 0° C. The predetermined second core temperature terminating the cooking period is in a temperature range between 40° C. and 70° C. such as ranges 45° C. to 65° C. or 50° C. to 60° C. Preferably the predetermined second core temperature is approximately 55° C. The predetermined third core temperature terminating the cooling period is in a temperature range between 10° C. and 40° C. such as ranges 15° C. to 35° C. or 20° C. to 30° C. Preferably the predetermined third core temperature is approximately 25° C. The predetermined first, second and third core temperatures are chosen on the basis of performing a series of test runs analysing a particular food products behaviour during the thawing, cooking and cooling process in the interior of the food processing unit. The test runs may be recorded and form the basis for further processing of that particular food product and the relevant temperature data stored in a data memory or database so that the predetermined temperature data for any tested food product easily may be utilised for following processing.

Further, in the first aspect of the present invention the thawing period is in a range between 20 and 500 minutes such as ranges 40 to 400 minutes or 80 to 200 minutes. The cooking period is in a range between 10 and 200 minutes such as ranges 20 to 150 minutes or 40 to 100 minutes. And the said cooling period is in a range between 40 and 400 minutes, such as ranges 60 to 300 minutes or 90 to 200 minutes. Any particular food product may have any duration of thawing, cooking and cooling depending on the texture and surface of the food product. By recording the temperature data as described above the timing data for any food product may correlated with the temperature data and thus monitoring of the temperature during subsequent processing of similar food products is rendered unnecessary since the ideal timing for the particular food product is known from the test runs.

Further, the first aspect of the present invention may comprise monitoring of air pressure in the interior space by utilising pressure sensor means measuring the air pressure and providing a pressure signal, and monitoring of the ambient temperature of the interior space by utilising interior temperature sensor means measuring the ambient temperature and providing a temperature signal. The first aspect of the present invention further controlling the air pressure and the ambient temperature of the interior space by utilising computing means receiving the pressure signal and the temperature signal during the thawing period, the cooking period and the cooling period by operating controllable valves ejecting steam and water into the interior space and by operating a controllable fan to re-circulated air within the interior space or to re-circulating exterior air within the interior space communicated from outside of the interior space. The first aspect of the present invention utilising computer means for controlling the air pressure and the ambient temperature of the interior space may provide for a detailed, accurate and repeatable control of the processing of food products. Computer means in this context should be construed as implemented by any form for processor techniques such as microcontroller technique, microprocessor technique, transputer technology, programmable logic devices or directly implemented by a custom design processor chip.

Above mentioned objects, advantages and features together with numerous other objects, advantages and features which will become evident from below detailed description of a further embodiment of the present Invention is according to a second aspect of the present invention obtained by a plant for processing food products in particular fish in a food processing unit defining an interior space having an ambient temperature and a relative humidity controllable by said food processing unit and comprising:

(a) a house for performing thawing of said food product during a thawing period by inserting said food product in an interior space of said house and ejecting steam and water into said interior space while continuously re-circulating air within said interior space so as to increase said ambient temperature to a first temperature and said relative humidity to a pre-set relative humidity value, for performing cooking of said food product in said interior space during a cooking period by firstly discontinuing ejecting water into said interior space while continuing ejecting steam into said interior space so as to increase said ambient temperature from said first temperature to a second temperature, and secondly as said ambient temperature reaches said second temperature re-circulating air within said interior space to maintain said ambient temperature at said second temperature, and for performing cooling of said food product in said interior space during a cooling period by discontinuing ejecting steam into said interior space while ejecting water into said interior space and continuously re-circulating exterior air within said interior space communicated from outside of said interior space so as to decrease said ambient temperature to a third temperature, (b) steam generating means for generating and communicating steam to said interior space during said thawing and said cooking of said food product, (c) sprinkling means for generating and communicating a water mist to said interior space during said thawing and said cooling of said food product, (d) ventilating means for re-circulating air within said interior space and for circulating exterior air inside said interior space during said thawing, said cooking and said cooling of said food product, (e) controllable valve means for controlling flow of steam and water to said steam generating means communicating steam to said interior space and to said sprinkling means communicating said water mist to said interior space, (f) a control unit for controlling said steam generating means, said sprinkling means, said ventilating means and said controllable valve means during said thawing, said cooking and said cooling steps of said food processing unit and said control unit calibrated by determining duration of said thawing period, duration of said cooking period and duration of said cooling period by utilising temperature sensitive means measuring a core temperature of said food product and establishing said duration of said thawing period, duration of said cooking period and said duration of cooling period according to said core temperature of said food product so as to terminate said thawing when said core temperature reaches a predetermined first core temperature, terminate said cooking when said core temperature reaches a predetermined second core temperature and terminate said cooling when said core temperature reaches a predetermined third core temperature, so as to establish an interior environment in said interior space enabling energy transfer between said food product and said interior environment while limiting dehydration of said food product.

In the basic realisation of the second aspect of the present invention the plant utilises the established temperatures and relative humidities during a process for further processing. Hence providing a plant that not only provides an environment for ensuring qualitative processing but also provides energy conservation.

The second aspect of the present invention further comprises all features of the first aspect of the present invention described above.

Above mentioned objects, advantages and features together with numerous other objects, advantages and features which will become evident from below detailed description of an alternative embodiment of the present invention is according to a third aspect of the present invention obtained by a plant for processing food products in particular fish in a food processing unit controlling ambient temperature and relative humidity within said food processing unit and comprising:

(a) a first house for performing thawing of said food product during a thawing period by inserting said food product in an first interior space of said house and ejecting steam and water into said first interior space while continuously re-circulating air within said interior space so as to maintain ambient temperature of said first interior space at a first temperature and relative humidity of said first interior space at a preset relative humidity value, (b) a second house for performing cooking of said food product in a second interior space during a cooking period by inserting said food product in said second interior, ejecting steam into said second interior space and re-circulating air within said second interior space so as to maintain ambient temperature of said second interior space at a second temperature, (c) a third house for performing cooling of said food product in a third interior space during a cooling period by inserting said food product in said third interior, ejecting water into said third interior space and continuously re-circulating exterior air within said third interior space communicated from outside of food processing unit so as to decrease ambient temperature to a third temperature, (d) steam generating means for generating and communicating steam to said first and second interior spaces during said thawing and said cooking of said food product, (e) sprinkling means for generating and communicating a water mist to said first and third interior spaces during said thawing and said cooling of said food product, (f) ventilating means for recirculating air within said interior space and for circulating exterior air inside said first, second and third interior space during said thawing, said cooking and said cooling of said food product, (g) controllable valve means for controlling flow of steam and water to said steam generating means communicating steam to said first and second interior spaces and to said sprinkling means communicating said water mist to said first and third interior spaces, and (h) a control unit for controlling said steam generating means, said sprinkling means, said ventilating means and said controllable valve means during said thawing, said cooking and said cooling steps of said food processing unit and said control unit calibrated by determining duration of said thawing period, duration of said cooking period and duration of said cooling period by utilising temperature sensitive means measuring a core temperature of said food product and establishing said duration of said thawing period, duration of said cooking period and said duration of cooling period according to said core temperature of said food product so as to terminate said thawing when said core temperature reaches a predetermined first core temperature, terminate said cooking when said core temperature reaches a predetermined second core temperature and terminate said cooling when said core temperature reaches a predetermined third core temperature, so as to establish an interior environment in said interior space enabling energy transfer between said food product and said interior environment while limiting dehydration of said food product.

In the basic realisation of the third aspect of the present invention the plant provides a qualitative food processing by ensuring the ideal temperatures and relative humidities during each processing step while maintaining a high efficiency.

The third aspect of the present invention further comprises all features of the first aspect and the second aspect of the present invention as described above and which will further be describe with reference to figures listed below.

In the following a number of preferred embodiments of the present invention will be described with reference to above listed figures.

Figure 1:
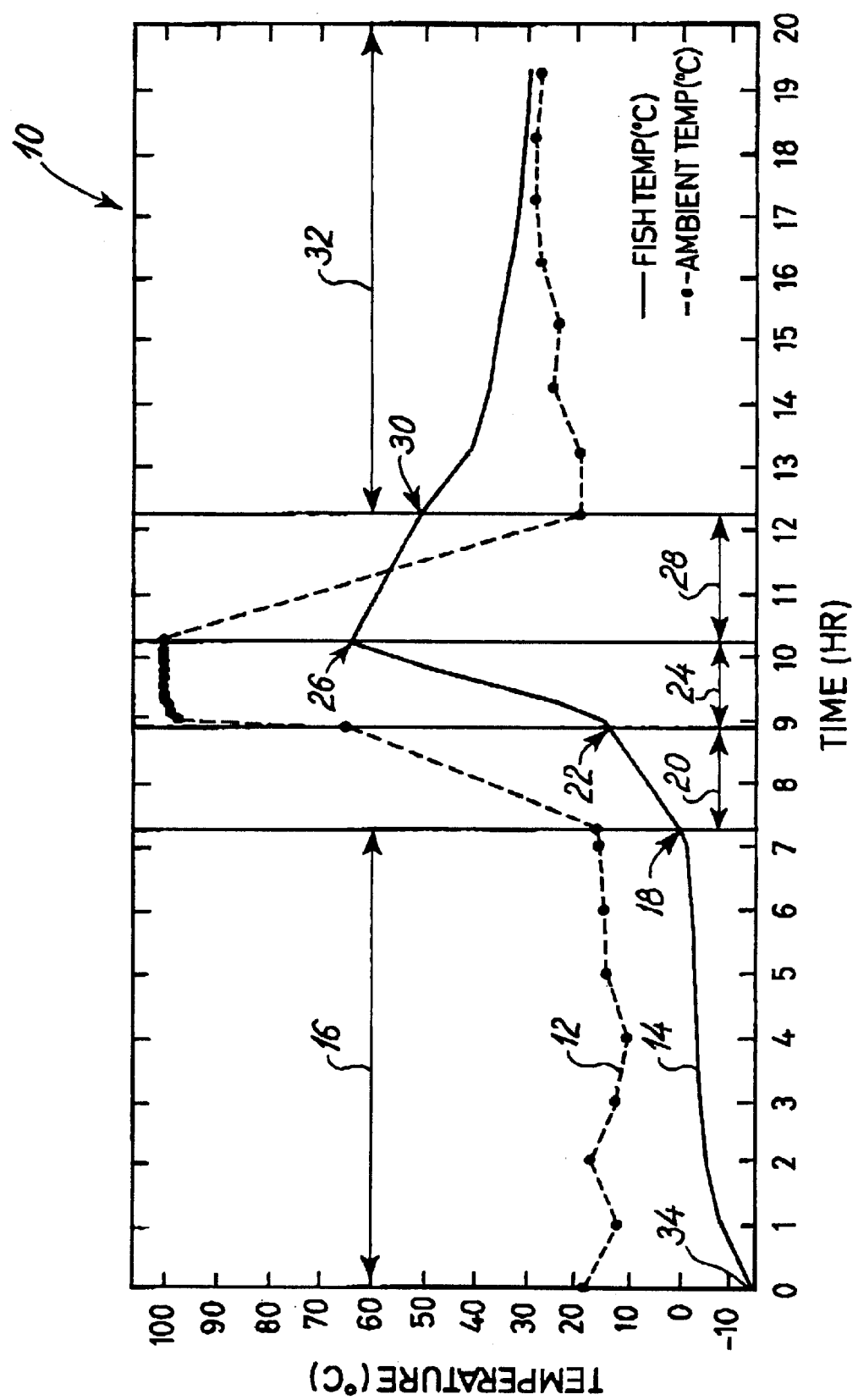
FIG. 1 shows a time versus temperature graph for a fish weighing 2.6 kg processed according to state of the art thawing and cooking techniques.

FIG. 1 shows a time versus temperature graph of a fish temperature profile for a fish weighing 2.6 kg processed by applying techniques according to the general state of the art, which time versus temperature graph is designated by numeral 10 in its entirety. The graph 10 comprises an ambient temperature curve 12 showing the variations of the ambient temperatures the fish is exposed to and a fish temperature curve 14 showing the variations in the fish core temperature during processing of a fish.

The processing according to the state of the art comprises a thawing step 16 in which the fish are submerged into a continuously re-circulated pool of salt water. The salt water is re-circulated at a flow rate of 40.5 kg per minute so as to provide a good temperature transfer between the fish and the salt water. The thawing step 16 continues until the fish temperature reaches approximately 0° C. defined by the fish temperature curve 14 by a point designated by numeral 18.

Further, the processing according to the state of the art comprises a staging step 20 in which the fish are removed from the salt water pool and exposed to the ambient temperature initially in the range from 10° C. to 18° C. and slowly increasing to approximately 60° C. until the fish core temperature reaches approximately 15° C. defined on the fish temperature curve 14 by a point designated by numeral 22.

Further, the processing according to the state of the art comprises a pre-cooking step 24 in which the fish are exposed to an ambient temperature of approximately 100° C. until the fish core temperature reaches approximately 65° C. defined on the fish temperature curve 14 by a point designated by numeral 26.

Further, the processing according to the state of the art comprises a spray cooling step 28 in which the ambient temperature is reduced from approximately 100° C. to approximately 20° C. by spraying the fish with cooling water until the fish core temperature reaches 50° C. defined on the fish temperature curve 14 by a point designated by numeral 30.

Finally the processing according to the state of the art comprises a chill conditioning step 32 during which the ambient temperature remains in the temperature range 20° C. to 30° C. until the fish core temperature reaches ambient temperature i.e. the fish temperature curve 14 and the ambient temperature curve coincide within a predetermined limit.

According to the time versus temperature graph 10 the fish have an initial fish core temperature of −14° C. defined on the fish temperature curve 14 by a point designated by numeral 34 and reaches a first intermediate core fish temperature of approximately 0° C. at the point 18 during seven and a quarter hours (435 minutes) of the thawing step 16. The ambient temperature varies slightly during the thawing step 16 between 10° C. and 18° C. due to opening and closing of doors accessing a first storage room in which the thawing step 16 is performed.

The fish are moved to a second storage room for performing the staging step 20. The fish core temperature is increased from the first intermediate fish temperature at approximately 0° C. at the point 18 to a second intermediate fish core temperature at approximately 15° C. at the point 22 during approximately one and a half-hour (90 minutes).

Subsequent to the staging step 20 the fish are moved to an oven for pre-cooking of the fish for one and a half-hour (90 minutes) thereby further increasing the fish core temperature from the second intermediate fish core temperature at approximately 15° C. at the point 22 to a maximum fish core temperature at approximately 65° C. at the point 26.

Following the pre-cooking step 24 the fish is removed from the oven and brought into an area where the fish is spray cooled for two hours (120 minutes) reducing the fish core temperature from the maximum fish core temperature at approximately 65° C. at the point 26 to a third intermediate fish core temperature at approximately 50° C. at the point 30.

Finally, according to the time versus temperature graph 10 the fish are placed in a room having a temperature in the temperature range between 20° C. and 30° C. during a chill conditioning step 32 until the fish reaches the ambient temperature of that room. This final chill conditioning step 32 may last as long as seven hours (420 minutes) bringing the total amount of time consumed by the process to nineteen and a quarter hours (1155 minutes). The duration of each step 16, 20, 24, 28 and 32 in the process is obviously a function of the weight of the fish and a function of the temperatures the fish are exposed to during each step.

Figure 2:
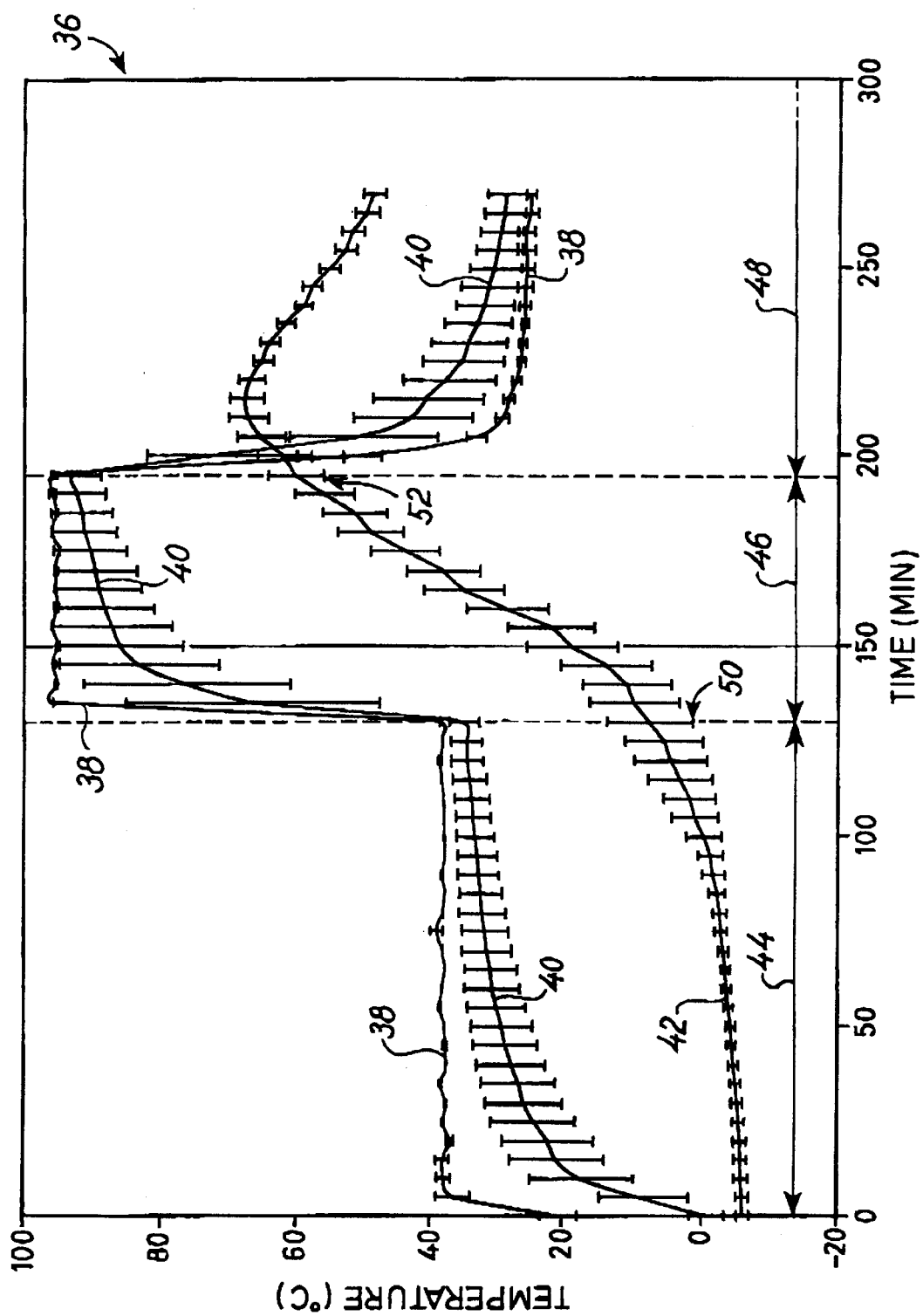
FIG. 2 shows a time versus temperature graph for a fish weighing 2.2 kg processed according to a preferred embodiment of the present invention.

FIG. 2 is a time versus temperature graph designated in its entirety by numeral 36 showing an ambient temperature curve 38, an average skin temperature curve 40 and an average backbone temperature curve 42 obtained during a processing method according to a preferred embodiment of the present invention. The curves 38, 40, and 42 are based on measurements performed on fish weighing approximately 2.2 kg. The vertical bars associated with each curve 38, 40, 42 indicate variations of temperatures. The vertical bars associated with the curve 38 show the temperature variation between 4 air temperature probes placed within a processing chamber measuring the atmospheric temperature of the processing chamber. The vertical bars associated with the curve 40 show the temperature variation between 6 skin temperature probes placed just under the skin of 6 different fish placed at 6 different locations in the processing chamber, which 6 skin temperature probes measure the skin temperature of the 6 fish. The vertical bars associated with the curve 42 show the temperature variation between 6 backbone temperature probes placed in the same fish having the skin temperature probes, which 6 backbone temperature probes measure the backbone temperature of the fish placed in the processing chamber.

As the graph 36 illustrates the method according to the preferred embodiment of the present invention comprises only three sections or processing steps: a thawing step 44, a cooking step 46, and a cooling step 48, whereas the state of the art techniques involved 5 steps as shown in FIG. 1. The duration of each of the processing steps 44, 46, 48 is determined in accordance with the calibration runs for a particular weight of fish in the preferred embodiment of the present invention and specifically in accordance with the worst case measurements of the above described six identical processing runs. In an alternative embodiment the duration of each of the processing steps 44, 46, 48 is determined by a preliminary estimation of the largest fish In a processing batch and by continuously measuring the skin temperature and/or the backbone temperature of the largest fish during all processing steps 44, 46, 48 and utilising these measurements to determine when the fish has reached a predetermined temperature in each processing step 44, 46, 48.

The thawing step 44 Is constituted by having a batch of fish having an initial average backbone temperature of −6° C. placed in an environment having an ambient temperature of 38° C. and a relative humidity of approximately 100% for a duration of time. The ambient temperature is maintained at 38° C. until the batch of fish has an approximate average backbone temperature of 0° C. By maintaining the ambient temperature at 38° C. an optimum thawing is achieved since the fish at this temperature achieves defrosting without damaging the fish meat quality generally caused by exposing the fish to excessive heat at the shortest possible time. Consequently the shortest possible defrosting period is realised without the fish endures excessive heat which reduces the quality of the fish.

The thawing step 44 in the preferred embodiment of the present invention is terminated after two hours and 10 minutes (130 minutes) for fish having a weight of approximately 2.2 kg. The thawing step 44 is completed when all of the 6 backbone temperature probes provide a signal corresponding to a first backbone temperature 50 of at least 0° C.

Following the thawing step 44 the cooking step 46 is initiated by increasing the ambient temperature in the environment to 95° C. The air contained in the processing chamber initially has the ambient temperature at 38° C. and the relative humidity at approximately 100% established during the thawing step 44. However, this air is exhausted from the processing chamber in order to avoid oxidisation of the surface of the fish, since despite the air has a relative humidity of 100% the air contains twenty times more atmospheric air relative to water vapour or steam. In order to replace this air within the processing chamber with a minimum of energy consumption by loss of heat, circulation within the processing chamber is terminated when the thawing step 44 has been completed and steam is injected into the processing chamber forcing the thawing air out. As the ambient temperature during the cooking step 46 reaches approximately 90° C. the circulation within the processing chamber is restarted. Subsequently, when the ambient temperature reaches 95° C. there is very little atmospheric air or oxygen left in the processing chamber and thus the steam introduced during the cooking step 44 provides a relative humidity is high that water spraying is not needed. The ambient temperature is maintained at 95° C. until all the measured backbone temperatures have reached a maximum backbone temperature 52 defined by a point on the curve 42 of 54° C. The duration of the cooking step 46 is defined between the first backbone temperature 50 and the maximum backbone temperature 52. The cooking step for fish weighing approximately 2.2 kg lasts for one hour and five minutes (65 minutes) in the first preferred embodiment of the present invention.

When the maximum backbone temperature 52 is reached the cooking step 46 is terminated and the cooling step 48 initiated by decreasing the ambient temperature in the environment to 26° C. and causing an adiabatic humidification by creating a water mist inside the environment.

The total time consumed by the process for thawing, cooking and cooling of fish weighing 2.2 kg is 5 hours and 50 minutes (350 minutes) which compared to state of the art methods for thawing, cooking and cooling is a significant reduction. The first preferred embodiment of the present invention hence provides a great reduction in power consumption and provides fish having greater recovery values.

Although the graph 36, shown in FIG. 2, shows the thawing, cooking and cooling of fish, the method according to the preferred embodiment of the present invention is not limited to fish. In fact any food products such as frozen deer, pigs, sheep, calves, cows or any combination thereof, or poultry such as frozen chicken, turkeys pheasants, ostriches or any combination thereof may be processed by the method according to the preferred embodiment of the present invention. Additionally, any product having any weight, texture or complexity may be processed by the preferred embodiment of the present invention simply by performing a calibration and thereby achieving the lowest backbone temperature 50 and the maximum backbone temperature 52 for that product.

Figure 3:
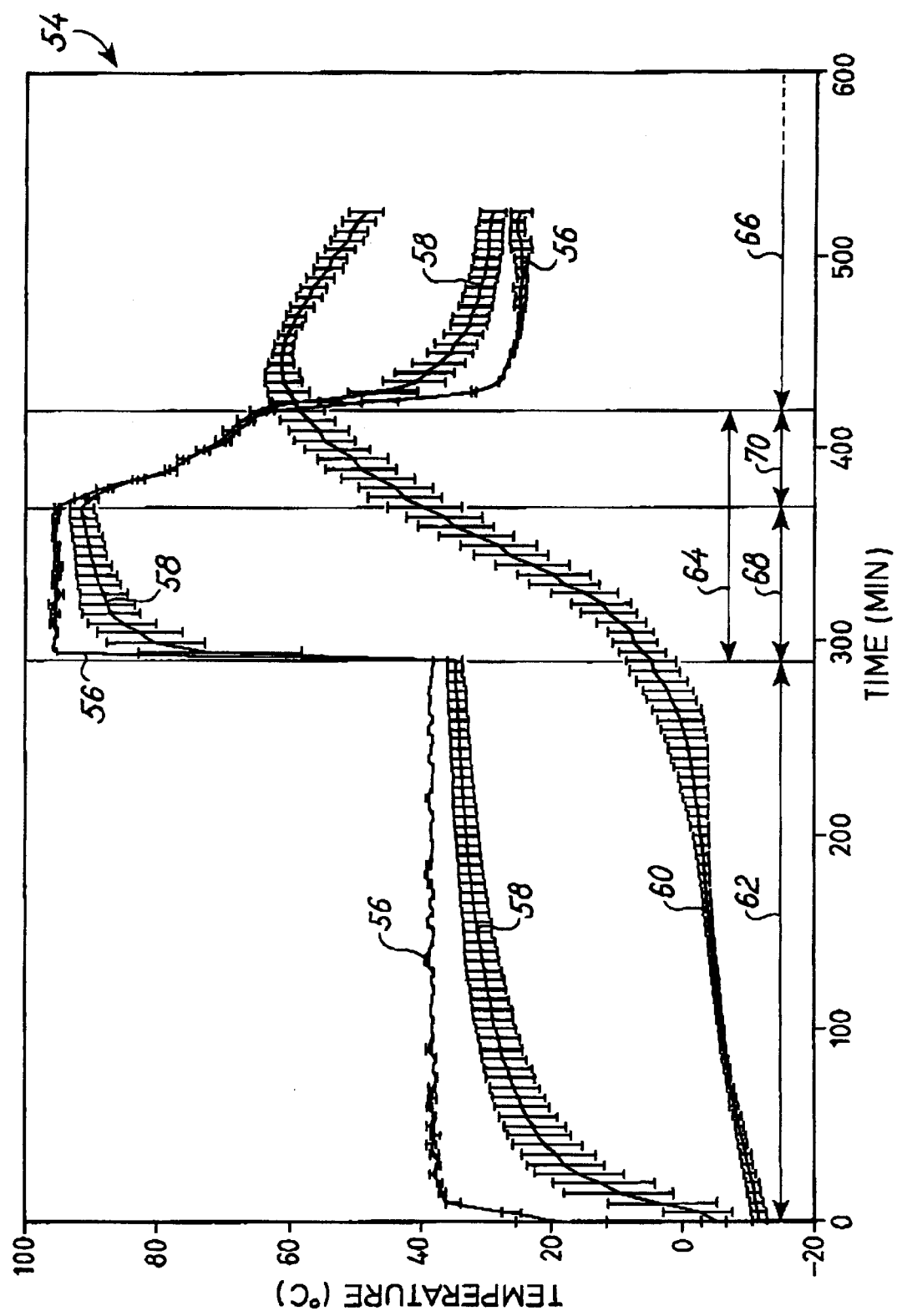
FIG. 3 shows a time versus temperature graph for a fish weighing 6.2 kg processed according to an alternative embodiment of the present invention.

FIG. 3 is a time versus temperature graph designated in its entirety by numeral 54 showing an ambient temperature curve 56, an average skin temperature curve 58 and an average backbone temperature curve 60 obtained during a processing method according to an alternative embodiment of the present Invention for fish weighing approximately 6.2 kg. Similarly as described above with reference to FIG. 2 the alternative method comprises three processing steps: a thawing step 62, a cooking step 64 and a cooling step 66. The cooking step 64 consists in the alternative embodiment of the present invention of two parts a first part 68 in which the full heating capacity is utilised and a second part 70 in which the heating capacity is partly utilised. This feature provides a reduction in power consumption applied to the environment without significantly increasing cooking time since the average backbone temperature according to the average backbone temperature curve 60 still increases regardless of the reduction in utilisation of full heating capacity. The ambient temperature is maintained at 95° C. until the backbone temperature has reached a temperature in the range from 38 to 40° C. At this stage the fish have received sufficient heat energy to complete the cooking step 46 without further injection of steam into the processing chamber. The backbone temperature of the fish continues to increase to 54° C. without further injection of steam.

The graph 54 further illustrates how the duration of the total process increases as a function of weight of the products to be thawed, cooked and cooled. The duration for fish weighing 6.2 kg is increased relative to fish weighing 2.2 kg to a total of 10 hours and 20 minutes (620 minutes).

Figure 4:
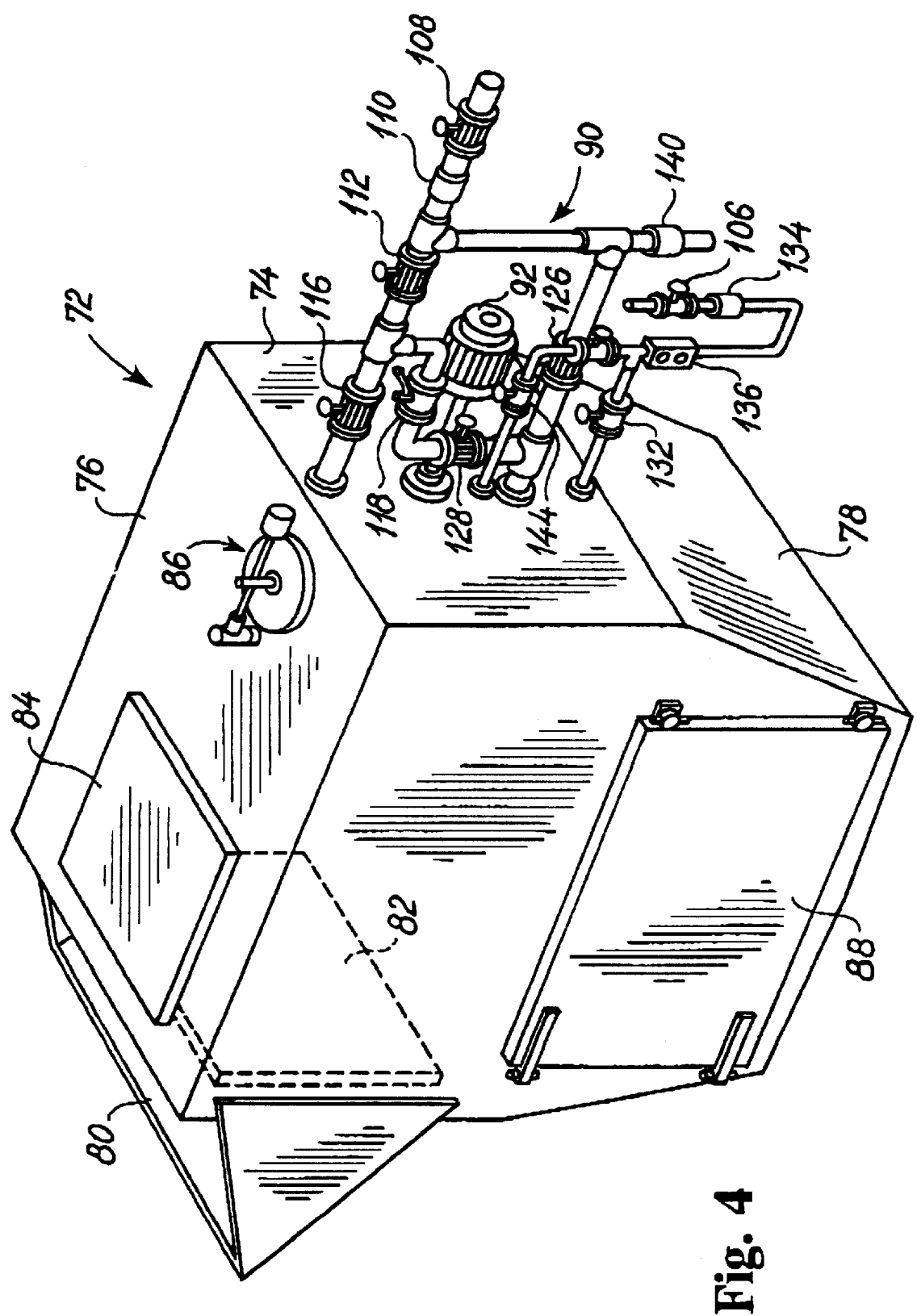
FIG. 4 shows a three dimensional view of a processing station establishing an environment for performing processing of a product according to the preferred embodiment of the present invention.

FIG. 4 shows a processing station designated in its entirety by numeral 72 for establishing a processing environment for performing the method according to the preferred or alternative embodiments of the present invention. The processing station 72 comprises a casing 74 having an upper part 76 and a lower part 78. The casing 74 is implemented in stainless steel, so as to ensure that the casing 74 does not corrode or deteriorate during or between processing. The upper part 76 has an overall rectangular shape and includes mounted on one side an air inlet channel 80 allowing exterior air to be introduced into the casing 74 through an inlet port 82. An outlet port 84 allows the interior air of the casing 74 to be ejected from the casing 74. In case the pressure in the casing 74 increases above a predefined threshold pressure a safety valve 86 opens and relieves the pressure built up in the casing 74.

The lower part 78 having an overall trapezoidal shape ensures that condensed water will gather in the bottom of the lower part 78. During the processing of products according to the preferred and alternative embodiment of the invention the casing 74 will experience ejection of water mist, water vapour and/or steam. Due to temperature variations between the ambient temperature within the casing 74 and temperature of the surfaces of the casing 74 some of the steam will condense on the surfaces of the casing 74. Since the lower part 78 constitutes a trapezoidal shaped space most of the condensed water is collected on the surfaces of the lower part 78 will be forced towards the bottom of the lower part 78.

The lower part 78 includes a door 88 for inserting the product to be thawed, cooked and cooled by the processing station 72. The size of the door 88 provides the operator the possibility for loading the processing station 72 with a plurality of racks or trays containing products of substantially the same texture and initial temperature.

A system of pipes 90 for introducing and ejecting water or fluids to and from the interior of the casing 74 is positioned opposite to the inlet channel 80 on the upper part 76 of the casing 74. Furthermore, an engine 92 for driving an internal fan 94 not visible in FIG. 4 is placed adjacent to the system of pipes 90. The water is ejected into the interior of the casing 74 as a water mist, water vapour and/or steam and the internal fan 94 provides spreading of the water mist, vapour and/or the steam within the interior of the casing 74. The water flow in the system of pipes 90 is controlled by a series valves which will be discussed with reference to FIG. 5.

Figure 5:
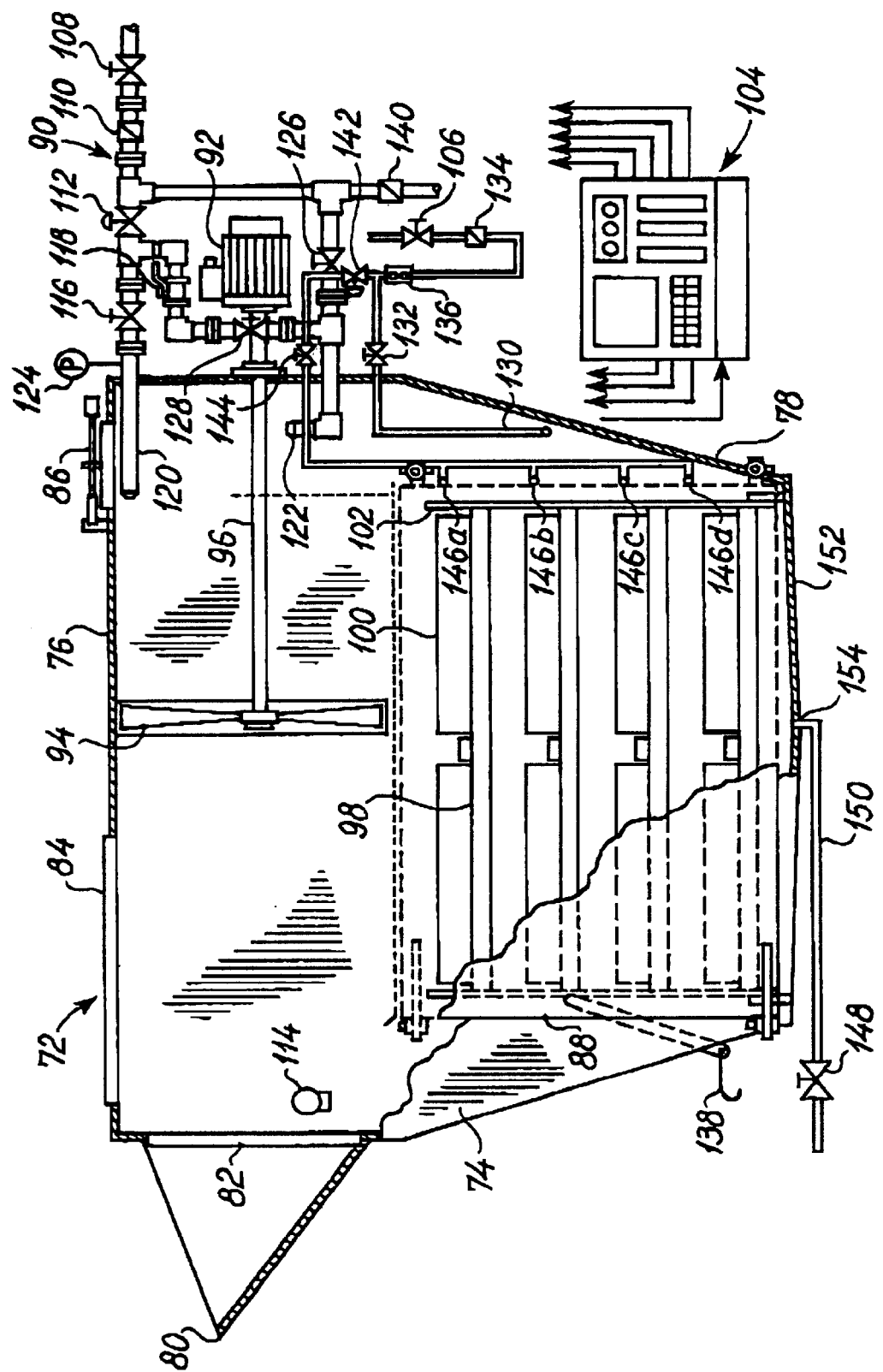
FIG. 5 shows a cut away side view of the processing station establishing an environment for performing processing of a product according to the preferred embodiment of the present invention.

FIG. 5 shows a cut away view of the processing station 72. The fan 94 is shown as connected to the engine by means of a driving shaft 96 protruding through the upper part 76. The engine 92 may be electrically, magnetically, hydraulically or combustion powered or any combinations thereof, however, the preferred embodiment of the present invention utilises a processing station 72 applying an electrically driven motor.

FIG. 5 further shows a plurality of shelves 98 for a multiple of trays 100 carried by a supporting structure 102 in the lower part 78 of the casing 74. The supporting structure 102 may incorporate wheels so as to allow the supporting structure 102 to be pushed into the processing station 72. Alternatively the supporting structure 102 may further or additionally incorporate means for receiving a folk lift. The supporting structure 102, the trays 100 and the shelves 98 are constructed in materials, which do not corrode or deteriorate when exposed to water and high temperatures. Furthermore the supporting structure 102, the trays 100 and the shelves 98 must be constructed from a material, which is accepted for use in conjunction with handling of food products. Preferably the supporting structure 102, the trays 100 and the shelves are constructed in stainless steel.

The trays 100 are constituted by a substantially rectangular shaped box having an open-ended top and a perforated bottom ensuring that water does not accumulate in the trays 100. Since the water generally runs through the trays 100 the efficiency of the thawing, cooking and cooling of the products in the processing station 72 is significantly reduced, because the temperature transfer between the product and the surroundings is increased.

A programmable logic controller (PLC) designated in its entirety by numeral 104 controls and monitors the processing of the products in the interior of the casing 74. The PLC 104 comprises a display and a keypad consisting of function keys, a general PC type keyboard, or alternatively a touch sensitive film mounted on the display. The process is initiated by loading processing parameters into the PLC 104. The processing parameters are determined from calibration runs as described above with reference to FIGS. 2 and 3 and determined in accordance to weight and texture of product to be processed. The processing parameters may include duration, temperature and humidity of each processing step, and may further include steam pressure, maximum allowable amount of water and steam utilised during processing of a batch of products and speed and cycle control of the fan 94. In an alternative embodiment of the present invention the processing parameters may be controlled in accordance with a feedback system having sensors providing feedback signals of thawing, cooking and cooling progress of a specimen of the products to be processed.

Prior to starting the thawing process the inlet and outlet ports 82, 84 and the door 88 are closed, then a main water valve 106 is opened so as to allow water flow from a household tank or a public water supply to the processing station 72, and a main steam valve 108 is opened so as to allow steam to be ejected into the interior of the casing 74 to ensure that the humidity during the thawing step reaches approximately 100%. An air compressor provides air pressure forcing the steam from the steam generator to the interior of the casing 74. Neither the air compressor nor the steam generator are shown in FIG. 5.

As the main steam valve 108 is opened the steam flows into the system of pipes 90 through a filter element. The steam is ejected into the interior of the casing 74 or not is determined by a first air-actuated valve 112 controlled by the PLC 104 in accordance with ambient temperature measured by a temperature sensor 114 and in accordance with the process parameters loaded on the PLC 104. The first air-actuated valve 112 remains closed as long as the fan 94 does not rotate If the ambient temperature is lower than 38° C. during the thawing step and the fan 94 is rotating then the first air-actuated valve 112 opens and allows steam to flow toward a first steam valve 116 and a second steam valve 118. The first steam valve 116 is opened and the second steam valve 118 is generally closed during thawing. The first steam valve 116 is controlled by the PLC 104 or alternatively manually by the operator in accordance with each step in the processing of the product. During thawing the steam is ejected into the interior of the casing 74 by a first steam spreader 120 and during cooking the steam is ejected into the interior of the casing 74 by the first steam spreader 120 and/or a second steam spreader 122. Meanwhile, a pressure gate 126 continuously monitors the pressure in the interior of the casing 74. In case the pressure increases beyond a threshold pressure value the safety valve 86 opens until the pressure reaches an allowable value.

The second steam valve 118 in conjunction with a steam by-pass valve 126 and a third steam valve 128 in closed positions prohibits steam from reaching the second steam spreader 122. The second steam spreader 122 is controlled manually or by the PLC 104 and is utilised for obtaining fast temperature increases for introducing large volumes of steam during the cooking step.

Steam is ejected into the interior of the casing 74 through the second steam spreader 120 during a thawing step if the fan 94 is rotating and the ambient temperature is lower than 38° C. The fan 94 ensures that the air inside the interior of the casing 74 continuously is re-circulated so that the air is heated by steam and humidified by a single thawing nozzle 130. The thawing nozzle 130 sprays water into the interior of the casing 74 so that the relative humidity reaches approximately 100% thus providing a thawing environment inside the interior of the casing 74. Hence establishing a high heat conducting capability while maintaining a good food product by avoiding significant dehydration of the food product.

Water is conducted to the thawing nozzle 130 through a thawing spray water valve 132 for controlling the water flow during the thawing step whenever the main water valve 106 is opened. Before entering the interior of the casing 74 the water is controlled by a flow measuring element 134 and controlled by a magnetic valve element 136.

At the conclusion of the thawing step the thawing spray water valve 132 and the main water valve 106 are closed and the cooking step is initiated by increasing the ambient temperature to a predefined cooking temperature input to the PLC 104. The increase in ambient temperature is accomplished by temporarily stopping the fan 94, opening bottom vents by activating a vent opening device 138, opening the first and third steam valves 118, 128 and closing the steam by-pass valve 126. Thus introducing steam to the interior of the casing 74 through the first and the second steam spreaders 120, 122. As the ambient temperature reaches the predefined cooking temperature the steam by-pass valve 126 is opened to divert steam back and out through a steam trap 140, the fan 94 is switched on so as to circulated the steam within the interior of the casing 74, and the bottom vents are closed by activating the vent opening device 138 so that the interior of the casing 74 accumulates steam and the ambient temperature is maintained at the predefined cooking temperature during the cooking step.

In a further alternative embodiment of the present invention the first and third steam valves 118 and 128 are operated so that the second steam spreader 122 provides steam to the interior of the casing 74 during a fraction of the total duration of cooking time. The fraction may be in the range 50% to 95% such as ranges 60% to 90% or 70% to 85%. However, preferably the fraction in the alternative embodiment of the present invention is 80% of the total duration of cooking. By cutting off the second steam spreader 122 prior to cutting off the first steam spreader 120 reductions in energy and water consumption are achieved without significant loss of quality of products and without any significant increase in cooking time.

As the cooking step is terminated the inlet and outlet ports 82 and 84 are opened so as to let fresh air into the interior of the casing 74 and further the main water valve 106 is reopened so as to allow water to the interior of the casing 74 through a second air-actuated valve 142. The second air-actuated valve 142 is controlled by the PLC 104 in accordance with a desired ambient temperature of the cooling step. The second air-actuated valve 142 opens and allows the water to flow into the interior of the casing 74 when a cooling spray water valve 144 is open and the second air-actuated valve 142 stays open until the ambient temperature falls below a desired and predetermined ambient temperature of the cooling step. The water is ejected into the interior of the casing 74 through a first series of cooling water nozzles 146a–d and a second series of cooling water nozzles not visible in FIG. 5. The first and second series of cooling water nozzles 146a–d provide a water mist in the interior of the casing 74 according to a programmed sequence loaded onto the PLC 104. At the same time the air undergoes an adiabatic humidification and the ambient temperature is reduced to 34° C. the ambient temperature is measured by the temperature sensor 114 located at the inlet port 82. Besides providing the cooling effect the water sprayed on the products prevents dehydration of the products by slowing down moisture mass transfer from the inside of the product to the outside surface of the product. Furthermore, the water sprayed on the product provides a protective film, which reduces surface oxidation reactions.

When the predefined ambient temperature is reached during the cooling step of the processing according to the preferred embodiment of the present invention the fan 94 is switched off, the main water valve 106 is closed and the cooling sequence performed by the PLC 104 is terminated. Water contained in the interior of the casing 74 is then drained from the interior by opening of a drain valve 148 positioned on a drainpipe 150 connected to a bottom surface 152 of the lower part 78 of the casing 74. The bottom surface 152 slopes toward a drain 154 connected to the drainpipe 150 and collects the water ejected into the interior of the casing 74.

Figure 6:
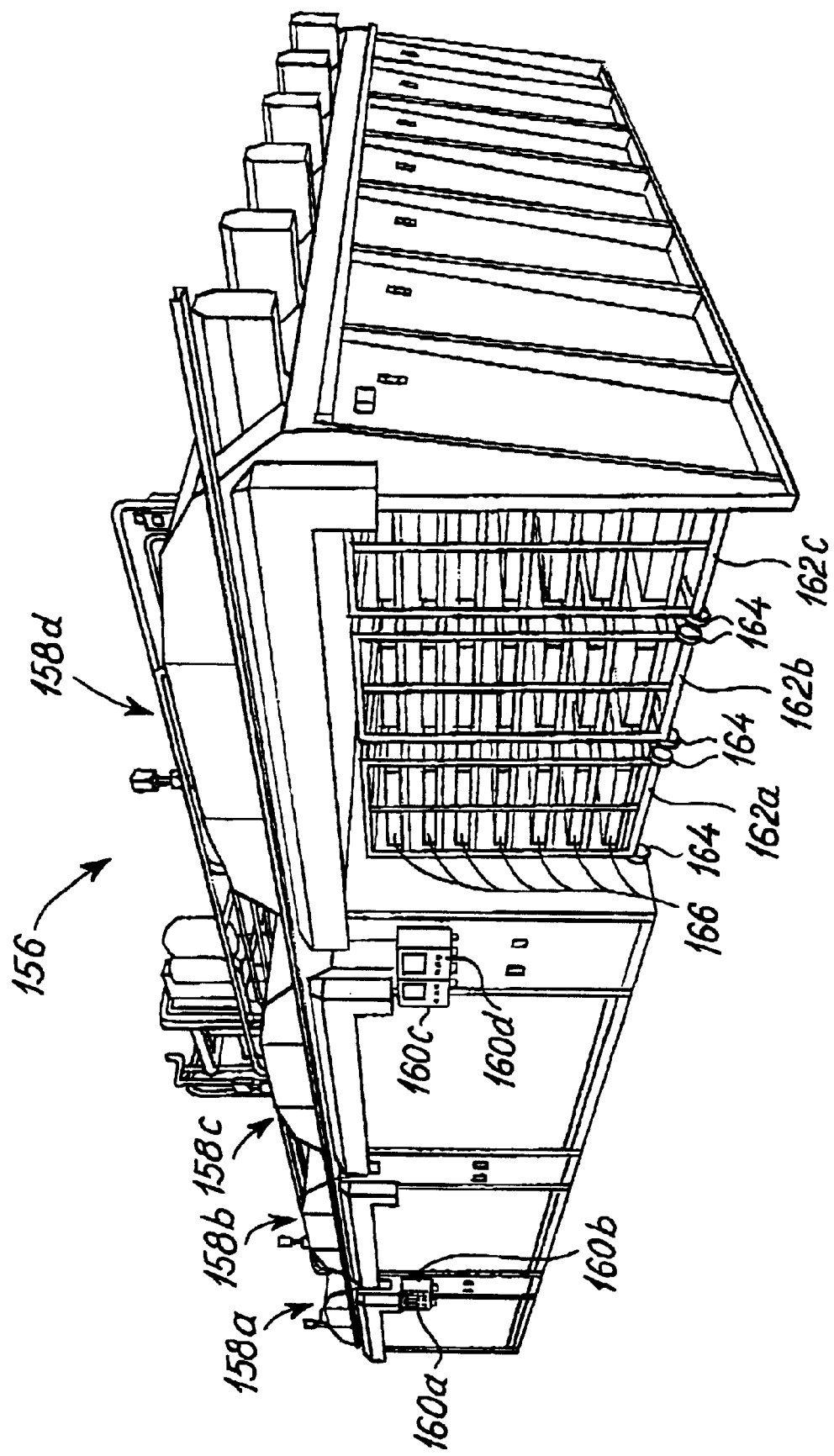
FIG. 6 shows a three dimensional view of a processing plant comprising a series of processing stations.

FIG. 6 shows a processing plant 156 comprising a plurality of processing stations 158a–c for establishing a processing environment for performing the method according to the preferred or alternative embodiments of the present invention. The processing plant 156 enables parallel concurrent processing of a plurality of batches of products. Each batch may consist of similar or different types of food product and the process performed on each batch In each of the processing stations 158a–c may utilise different calibrations and different processing parameters.

In FIG. 6 four processing stations 158a–c are shown. The processing stations 158a–c are controlled by individual PLC units 160a–d, which may in a further alternative embodiment of the present invention be interconnected so as to continuously communicate state of operations and current operations to each other allowing the processing plant 156 to re-circulate air from one processing station 158a–c to the next thus saving heating expenses. Alternatively, the individual PLC units 160a–d may in a further alternative embodiment of the present invention be interconnected through to a computer network having a computer receiving all data from the PLC units 160a–d and providing the operator with a visualisation of the complete system.

The processing plant 156 receives the food products In trolleys 162a–c having supporting wheels 164 to enable transport of the trolleys 162a–c. Similarly to the trolleys 158 described with reference to FIG. 5, the trolleys 162a–c comprises a supporting structure having shelves for receiving trays 164 containing the food products. The processing stations 158a–c shown in FIG. 6 receive a plurality of the trolleys 162a–c e.g. a capacity of 3, 6, 9, 12 or 15 trolleys 162 being processed during one processing session.

Figure 7:
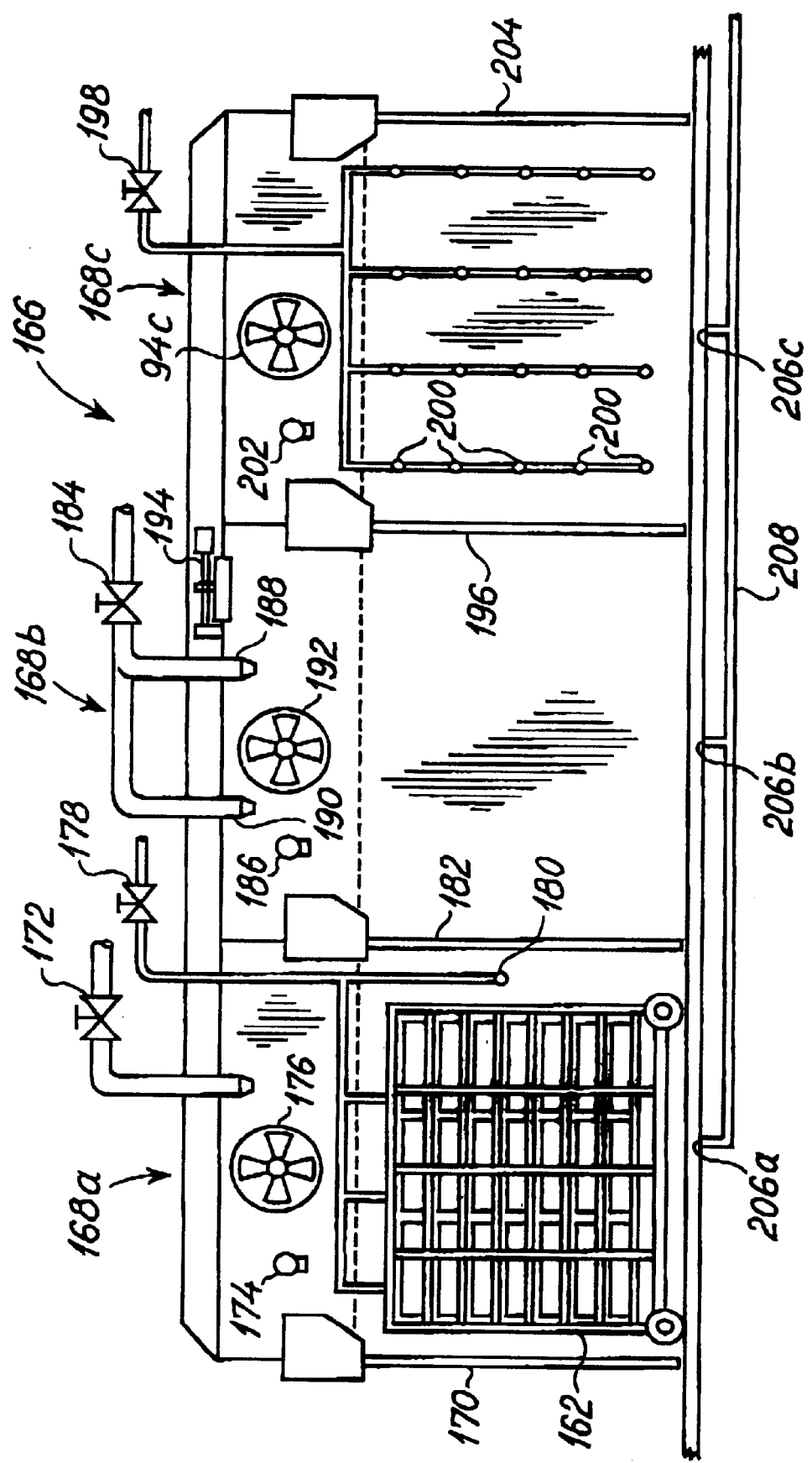
FIG. 7 shows a side view of an alternative processing plant comprising a series of processing stations each performing one operation.

FIG. 7 shows an alternative processing plant 166 comprising a plurality of processing stations 168a–c for establishing a processing environment for performing the method according to the preferred or alternative embodiments of the present invention. The alternative processing plant 166 provides the thawing in a first processing station 168a of the processing plant 166, the cooking in a second processing station 168b and finally the cooling in a third processing station 168c.

The first processing station 168a comprises a first door 170 for receiving a plurality of trolleys similar to the trolleys 162a–c described with reference to FIG. 5, and an air-actuated steam valve 172 controlled by an individual PLC unit, a personal computer or any similar microprocessor unit in accordance with ambient temperature measured by a temperature sensor 174 and in accordance with the process parameters loaded on the PLC unit, the personal computer or any similar microprocessor unit.

The air-actuated steam valve 172 remains closed as long as a fan 176 does not rotate. If the ambient temperature is lower than 38° C. during the thawing step and the fan 176 is rotating then the first air-actuated steam valve 172 opens and allows steam to flow toward the first processing station 168a. A thawing spray water line valve 178 is opened to provide a water flow towards a plurality of thawing nozzles 180 spraying water in the first processing station 168a thus providing a thawing environment in the first processing station 168a. The thawing environment due to the plurality of thawing nozzles 180 provides a high heat conducting capability while maintaining a high quality of food product by avoiding significant dehydration of the food product. The fan 176 ensures that the air in the first processing station 168a continuously is re-circulated so that the air is heated by steam and humidified by the plurality thawing nozzles 180. The relative humidity in the first processing station 168a reaches approximately 100%.

When the products in the trolleys 162 have reached a backbone temperature of approximately 0° C. a second door 182 is opened and the trolleys 162 are moved to the second processing station 168b. The trolleys 162 may be moved manually or by means of a conveyor means locking on to each trolley 162 and automatically moving each trolley 162 to the second processing station 168b.

The second processing station 168b comprises an air-actuated steam valve 184 controlled by the PLC unit, the personal computer or the similar microprocessor unit controlling the first processing station 168a or controlled an individual PLC unit, personal computer or any similar microprocessor unit. The air-actuated steam valve 184 is controlled in accordance with ambient temperature measured by a temperature sensor 186 and in accordance with the process parameters loaded on either an individual or central PLC unit, the personal computer or any similar microprocessor unit. The air-actuated steam valve 184 provides a flow of steam to two parallel steam spreaders 188 and 190 heating the second processing station 168b by introducing steam having a fan 192 recirculating the air inside the second processing station 168b so as to reach and maintain an ambient temperature inside the second processing station 168b of approximately 95° C.

If the pressure within the second processing station 168b increases above a threshold value a safety valve 194, similar to the safety valve 86 described with reference to FIGS. 4 and 5, opens and relieves the pressure until the pressure is within acceptable tolerances.

When a satisfactory cooking of the products on the trolley 162 is achieved a third door 196 is opened and the trolley 162 further moved into the third processing station 168c for providing the cooling of the products. As the trolley 162 is moved into the third processing station 168c the third door 196 is closed and the cooling process initiated by actuating the air-actuated cooling water valve 198, similar to the air-actuated valve 142 described with reference to FIG. 5. Cooling water is ejected into the third processing station 168c through a plurality of cooling water nozzles 200 providing a water mist in the third processing station 168c according to a programmed sequence loaded onto the above mentioned central PLC, personal computer or any similar microprocessor or on an individual PLC, personal computer or any similar microprocessor. The plurality of cooling nozzles 200 ensures that the air undergoes an adiabatic humidification and the ambient temperature is reduced to 34° C. measured by a temperature sensor 202. Besides providing the cooling effect the water as described with reference to FIG. 5 prevents dehydration of the products by slowing down moisture mass transfer from the inside of the product to the outside surface of the product. Furthermore, the water sprayed on the product provides a protective film, which reduces surface oxidation reactions. When the products reach an acceptable backbone temperature the trolley 162 is moved out of the third processing station 168c through a fourth door 204. During the processing to the products water is drained from each of the processing stations 168a–c through drains 206a–c receiving water sprayed onto the products or condensed water. The water is directed through a drainpipe 208, similar to the drainpipe 150 described with reference to FIG. 5, away from the processing stations 168a–c for direct reuse or for cleaning so that the water may be reused for different products.

What is claimed is:

1. A method of processing a food product in a food processing unit defining an interior space having an ambient temperature and a relative humidity controllable by said food processing unit, and comprising the steps of:

(a) thawing said food product during a thawing period by inserting said food product in said interior space of said food processing unit and ejecting steam and water into said interior space while continuously re-circulating air within said interior space so as to increase said ambient temperature to a first temperature and said relative humidity to a pre-set relative humidity value;

(b) cooking said food product in said interior space of said food processing unit during a cooking period by first discontinuing ejecting water into said interior space while continuing ejecting steam into said interior space so as to increase said ambient temperature from said first temperature to a second temperature, and secondly, as said ambient temperature reaches said second temperature, recirculating air within said interior space to maintain said ambient temperature at said second temperature;

(c) cooling said food product in said interior space of said food processing unit during a cooling period by discontinuing ejecting steam into said interior space while ejecting water into said interior space and continuously re-circulating exterior air within said interior space communicated from outside of said interior space so as to decrease said ambient temperature to a third temperature; and (d) calibrating said food processing unit by determining the duration of said thawing period, the duration of said cooking period and the duration of said cooling period by utilizing temperature sensitive means measuring a core temperature of said food product and establishing said duration of said thawing period, said duration of said cooking period and said duration of cooling period according to said core temperature of said food product so as to terminate said thawing when said core temperature reaches a predetermined first core temperature, terminate said cooking when said core temperature reaches a predetermined second core temperature and terminate said cooling when said core temperature reaches a predetermined third core temperature;

so as to establish an interior environment in said interior space enabling energy transfer between said food product and said interior environment while limiting dehydration of said food product.

2. The method of claim 1, wherein thawing, cooking and cooling are performed as a continuous sequence so as to achieve low energy consumption of said food processing unit.

3. The method of claim 1 wherein said food product is selected from the group consisting of diary products, vegetable products, fruit products, poultry products, meat products, fish products, and any combinations thereof.

4. The method of claim 1, wherein said interior space of said food processing unit defines a single compartment for receiving said food product and for sequentially performing said thawing, said cooking and said cooling of said food product.

5. The method of claim 1, wherein said interior space of said food processing unit defines a plurality of compartments for sequentially receiving said food product and for performing said thawing, said cooking and said cooling of the food product in separate compartments.

6. The method of claim 1, wherein said pre-set relative humidity value is defined in a relative humidity range between 80% and 100%, wherein said first temperature is defined in a temperature range between 30° C. and 50° C., wherein said second temperature is defined in a temperature range between 90° C. and 100° C., and wherein said third temperature is defined in a temperature range between 15° C. and 35° C., all temperatures measured at normal atmospheric pressure.

7. The method of claim 1, wherein said predetermined first core temperature terminating said thawing period is in a temperature range between −5° C. and +5° C., said predetermined second core temperature terminating said cooking period is in a temperature range between 40° C. and 70° C., and said predetermined third core temperature terminating said cooling period is in a temperature range between 10° C. and 40° C.

8. The method of claim 1, wherein said thawing period is in a range between 20 and 500 minutes, said cooking period is in a range between 10 and 200 minutes, and said cooling period is in a range between 40 and 400 minutes.

9. The method of claim 1, wherein said method further comprises monitoring of air pressure in said interior space by utilizing pressure sensor means for measuring said air pressure and providing a pressure signal, monitoring of said ambient temperature of said interior space by utilizing interior temperature sensor means, for measuring said ambient temperature and providing a temperature signal, and controlling said air pressure and said ambient temperature of said interior space by utilizing computing means for receiving said pressure signal and said temperature signal during said thawing period, said cooking period and said cooling period by operating controllable valves ejecting steam and water into said interior space and by operating a controllable fan to circulate air within said interior space.

10. A plant for processing a food product in a food processing unit defining an interior space having an ambient temperature and a relative humidity controllable by said food processing unit and comprising:

(a) a casing for thawing said food product during a thawing period by inserting said food product in an interior space of said casing and ejecting steam and water into said interior space while continuously re-circulating air within said interior space so as to increase said ambient temperature to a first temperature and said relative humidity to a pre-set relative humidity value, for cooking said food product in said interior space during a cooking period by first discontinuing ejecting water into said interior space while continuing ejecting steam into said interior space so as to increase said ambient temperature from said first temperature to a second temperature, and secondly as said ambient temperature reaches said second temperature re-circulating air within said interior space to maintain said ambient temperature at said second temperature, and for cooling said food product in said interior space during a cooling period by discontinuing ejecting steam into said interior space while ejecting water into said interior space and continuously re-circulating exterior air within said interior space communicated from outside of said interior space so as to decrease said ambient temperature to a third temperature;

(b) steam generating means for generating and communicating steam to said interior space during said thawing and said cooking of said food product;

(c) sprinkling means for generating and communicating a water mist to said interior space during said thawing and said cooling of said food product;

(d) ventilating means for re-circulating air within said interior space and for circulating exterior air inside said interior space during said thawing, said cooking and said cooling of said food product;

(e) controllable valve means for controlling the flow of steam and water to said steam generating means, communicating steam to said interior space and to said sprinkling means, and communicating said water mist to said interior space;

(f) a control unit for controlling said steam generating means, said sprinkling means, said ventilating means and said controllable valve means during said thawing, said cooking and said cooling periods of said food processing unit and said control unit calibrated by determining the duration of said thawing period, the duration of said cooking period and the duration of said cooling period by utilizing temperature sensitive means for measuring a core temperature of said food product, and establishing said duration of said thawing period, said duration of said cooking period and said duration of cooling period according to said core temperature of said food product so as to terminate said thawing when said core temperature reaches a predetermined first core temperature, terminate said cooking when said core temperature reaches a predetermined second core temperature and terminate said cooling when said core temperature reaches a predetermined third core temperature, so as to establish an interior environment in said interior space enabling energy transfer between said food product and said interior environment while limiting dehydration of said food product.

11. A plant for processing a food product in a food processing unit controlling ambient temperature and relative humidity within said food processing unit and comprising:

(a) a first station for thawing said food product during a thawing period by inserting said food product in a first interior space of said first station and ejecting steam and water into said first interior space while continuously re-circulating air within said first interior space so as to maintain ambient temperature of said first interior space at a first temperature and relative humidity of said first interior space at a pre-set relative humidity value;

(b) a second station for cooking said food product in a second interior space during a cooking period by inserting said food product in said second interior space, ejecting steam into said second interior space and re-circulating air within said second interior space so as to maintain the ambient temperature of said second interior space at a second temperature;

(c) a third station for cooling said food product in a third interior space during a cooling period by inserting said food product in said third interior space, ejecting water into said third interior space and continuously re-circulating exterior air within said third interior space communicated from outside of the food processing unit so as to decrease the ambient temperature to a third temperature;

(d) steam generating means for generating and communicating steam to said first and second interior spaces during said thawing and said cooking of said food product;

(e) sprinkling means for generating and communicating a water mist to said first and third interior spaces during said thawing and said cooling of said food product;

(f) ventilating means for re-circulating air within said interior space and for circulating exterior air inside said first, second and third interior spaces during said thawing, said cooking and said cooling of said food product;

(g) controllable valve means for controlling the flow of steam and water to said steam generating means, communicating steam to said first and second interior space and to said sprinkling means, and communicating said water mist to said first and third interior spaces, and (h) a control unit for controlling said steam generating means, said sprinkling means, said ventilating means and said controllable valve means during said thawing, said cooking and said cooling periods of said food processing unit and said control unit calibrated by determining the duration of said thawing period, the duration of said cooking period and the duration of said cooling period by utilizing temperature sensitive means for measuring a core temperature of said food product and establishing said duration of said thawing period, duration of said cooking period and said duration of cooling period according to said core temperature of said food product so as to terminate said thawing when said core temperature reaches a predetermined first core temperature, terminate said cooking when said core temperature reaches a predetermined second core temperature and terminate said cooling when said core temperature reaches a predetermined third core temperature, so as to establish an interior environment in said food processing unit enabling energy transfer between said food product and said interior environment while limiting dehydration of said food product.

* * * * *